United States Patent [19]

Narayan et al.

[11] Patent Number: 5,838,355

[45] Date of Patent: Nov. 17, 1998

[54] PRINTER SYSTEM UTILIZING THREE DIFFERENT DATA RATES

[75] Inventors: Badhri Narayan; Drew D. Summers, both of Rochester, N.Y.

[73] Assignee: Eastman Kodak Company, Rochester, N.Y.

[21] Appl. No.: 841,442

[22] Filed: Apr. 22, 1997

[51] Int. Cl.$^6$ ........................................................ B41J 2/47
[52] U.S. Cl. .......................... 347/115; 347/247; 347/232; 358/218; 358/521
[58] Field of Search ..................................... 347/115, 116, 347/135, 237, 248, 249, 247, 232; 358/518, 521, 533, 531; 395/101, 107, 111

[56] References Cited

U.S. PATENT DOCUMENTS

| | | |
|---|---|---|
| 4,396,254 | 8/1983 | Shibuya . |
| 4,728,965 | 3/1988 | Kessler et al. . |
| 4,821,113 | 4/1989 | McQuade et al. . |
| 4,980,757 | 12/1990 | Nishigaki ................................ 358/521 |
| 5,018,805 | 5/1991 | Kessler . |
| 5,111,325 | 5/1992 | DeJager . |
| 5,475,415 | 12/1995 | Noethen . |

OTHER PUBLICATIONS

Cineon Printer made by Eastman Kodak Company, "Deviation from Linearity with Compensated EFL", CBWooley, p. 250.

Primary Examiner—Mark J. Reinhart
Attorney, Agent, or Firm—Svetlana Z. Short

[57] ABSTRACT

A printer system includes (a) an f-θ lens producing lateral color aberration; (b) three laser light sources, each producing a light beam for use with said f-θ lens; and (c) modulators modulating these laser light beams at different data rates from one another. The ratio of the different data rates is being used to compensate for the lateral color aberration produced by the f-θ lens.

13 Claims, 6 Drawing Sheets

PRINTER SYSTEM UTILIZING THREE DIFFERENT DATA RATES

CROSS REFERENCE TO RELATED APPLICATIONS

This application is related to the following applications filed concurrently herewith:

"A Printer System" of Badhri Narayan, John D. Griffith and Michael E. Harrigan Ser. No. 08/841,443;

"An F-θ Lens" of John D. Griffith Ser. No. 08/841,418.

FIELD OF THE INVENTION

This invention relates to a printer system, and more particularly, to a printer system utilizing three different data rates to compensate for the lateral color aberration produced by f-θ lens.

BACKGROUND OF THE INVENTION

Laser printers are used in the photographic and graphic arts for printing on a photosensitive medium such as film or paper. When such printers are used for color imaging, they generally include three different light sources, each providing a light beam of a different wavelength. Light beams from these light sources are individually shaped by three separate sets of beam shaping optics (one set for each light beam), and are then combined into a single light beam with three collinear components. This light beam is then scanned over an angular range by a rotating polygon with a plurality of reflective facets. An f-θ lens is located in the optical path between the polygon and the photosensitive medium. The single light beam, when incident on the polygon and the f-θ lens, is typically collimated in each of the three wavelengths. The f-θ lens is usually designed to correct both axial and lateral color at the image plane, assuming it receives a collimated input beam. Thus, different color spots are superimposed on one another at the image surface. Such f-θ lenses are expensive.

U.S. Pat. No. 5,111,325 and U.S. Pat. No. 5,018,805 each disclose a color printer that operates with light beams at the wavelengths 750 nm, 810 nm, and 870 nm (I.R. region). This printer utilizes three sets of beam shaping optics. Because the printer is operating in the infra-red (I.R.) region, this printer can not use conventional, silver halide based, photographic paper for printing images thereon. Instead it has to use "false sensitized" paper that is matched to specific wavelengths of interest (i.e., 780 nm, 830 nm and 880 nm).

More specifically, the f-θ lens disclosed in U.S. Pat. No. 5,111,325 operates with three light beams whose vergences are controlled independently of one another. The word "vergence", as used herein refers to whether the input light beam to the f-θ lens is collimated, converging or diverging. A collimated light beam has zero vergence, a diverging light beam has negative vergence and a converging light beam has positive vergence. The concept of "vergence" is described in more detail in column 4, lines 46–62 of the above mentioned U.S. Pat. No. 5,111,325. Since axial color is a focus related phenomenon, it is caused not only by aberrations of the f-θ lens itself, but also by the vergence of the input beam to the f-θ lens. In the printer disclosed in U.S. Pat. No. 5,111,325 and U.S. Pat. No. 5,018,805, the desired vergence in each of the three light beams is controlled by its own set of beam shaping optics located in each color channel. Therefore, at least three sets of independent beam shaping optics are required by this printer. These three sets of beam shaping optics provide the ability to control the vergences of the three light beams separately, which greatly reduces the problem of correcting axial color. However, in order to reduce the manufacturing and assembly costs, it would be desirable to have a printer with only one set of beam shaping optics.

Eastman Kodak Company produces the Cineon™ printer that operates with visible wavelength laser sources. This printer utilizes two data clocks that are run at two different data rates to correct for the lateral color aberration. However, because this printer uses three light beams (red, blue, green) it utilizes a very expensive, complex, nine element f-θ lens to bring blue and red color spots close to one another (at the image surface). It is desirable to have a printer with a less expensive, less complex f-θ lens.

SUMMARY OF THE INVENTION

It is an object of the present invention to overcome the problems in the prior art discussed above and to provide an improved color printer.

According to the present invention, a printer system includes: (a) an f-θ lens producing lateral color aberration; (b) three laser light sources, each producing a light beam for use with said f-θ lens; and (c) modulators modulating these laser light beams at different data rates from one another. The modulators are adapted to change the intensity of these light beams. The ratio of the different data rates is being used to compensate for the lateral color aberration produced by the f-θ lens.

Also, according to a preferred embodiment of the present invention a printer system for printing on an associated photosensitive medium includes:

(a) An image information store. This image information store contains three values for each pixel in the image to be created. Each of three values represents the required level of intensity of light in one of three required wavelengths, the wavelengths match the spectral sensitivity of the associated photosensitive medium so as to produce full color images when impinging on the associated photosensitive medium.

(b) A processor processing the values.

(c) Three laser light sources, each of which generates a light beam. Each of the light beams is of the above mentioned required wavelength.

(d) Three modulators driven by the processor. Each of the modulators modulates intensity of one of the light beams by image data, at different data rates from one another.

(e) A beam combiner that combines the three modulated light beams into a single light beam.

(f) A light deflector that deflects the single light beam and performs a scanning function, thereby providing a deflected light beam.

(h) An axial color achromatic f-θ lens that (i) intercepts the deflected light beam, (ii) focuses the deflected light on the associated photosensitive medium, and (iii) produces lateral color aberration in a line scan direction, thereby placing different wavelength portions of the focused beam into three different spots located along a line scan direction on the associated photosensitive medium.

Also, according to the preferred embodiment of the present invention the data rates are:

$$f_B = k_1 \times f_G;$$

and $$f_R = k_2 \times f_G,$$

where $f_B$, $f_G$ and $f_R$ are data input rates for blue, green and red wavelengths beams, k1 and k2 are constants chosen to compensate for spot separation during a line scan.

A principal advantage of the printer system of the present invention is that it will operate with an f-θ lens that is uncorrected for the lateral color aberration at three different visible light wavelengths simultaneously, so as to superimpose the image spots on each other, provided the incident light beams are modulated at appropriate data rates to correct lateral color aberration.

Other features and advantages will become apparent with reference to the following description of the preferred embodiments when read in light of the attached drawings.

BRIEF DESCRIPTION OF THE DRAWINGS

FIG. 1c is a top plan view showing the lens element arrangement in the f-θ lens shown in FIG. 1a.

FIGS. 3a–3c are plan views of the f-θ lens, the plano mirror and the cylindrical mirror illustrated in FIG. 2a. More specifically, FIGS. 3a–3c show the path of the deflected light beam 42 for the polygon rotations of 0°,–13.5°, and +13.5°, respectively.

FIG. 5 is a schematic illustration of how one of the light beams is directed to one of the modulator of the printer system of FIG. 1a.

FIG. 6 is a schematic illustration showing how light beams may be coupled to fibers and then directed to the modulators of the printer system of FIG. 1a.

DESCRIPTION OF THE PREFERRED EMBODIMENT

Printer System

In the following discussion and throughout this application the term "page direction" means the cross-scan direction. It is the direction perpendicular to the scan line produced by a rotation of a polygon or other deflector. The term "line direction" means the direction of the scan line produced by the rotation of the polygon or other deflectors. These directions must be understood in the context of the local coordinate system of an optical component; the coordinate system will be tilted by fold mirrors. The optical axis of the printer system is the Z axis, the page direction is the X direction, and the line direction is the Y-direction.

According to the preferred embodiment of the present invention, a printer system includes (a) a digital image store, containing three values for each pixel of at least a scan line that is being scanned, each of the three values representing the intensity required at one of three wavelengths to produce a correct color on an associated photosensitive medium, (b) three laser sources, each laser source producing a light beam of a different wavelength, (c) a means for individually modulating the intensity of each of the three light beams to provide three modulated light beams, (d) a means for combining the three modulated light beams into a single beam, (e) a single set of apochromatic beam shaping optics shaping the single beam to create a shaped light beam having different vergences in page and line directions, (f) a deflector such as a rotating polygon with a plurality of reflective facets, which deflects the shaped beam, (g) an f-θ lens which is corrected for primary and secondary axial color, but is uncorrected for lateral color, (h) a conjugating cylindrical mirror used in conjunction with the f-θ lens to correct pyramid error of the printer system simultaneously in all three wavelengths, (i) a means to transport the associated photosensitive medium in a direction perpendicular to the scan line created by the rotation of the deflector. According to a preferred embodiment of the present invention, the associated photosensitive medium is a conventional photographic paper sensitive to light beams at the wavelengths produced by the above mentioned laser sources. According to a preferred embodiment of the present invention, the photosensitive medium is a planar, that is, a sheet of photosensitive material.

The lateral color in the f-θ lens is corrected by reading the values from the digital image store, processing the values with a processor unit, and modulating the corresponding light beams with three modulators at three different data rates. The pixel data in the digital image store controls the intensities of the beams of the three lasers by controlling the modulators. The separation of the different color spots (FIG. 1b) is compensated for by moving data from the digital image store to the modulator control circuitry at three different data rates.

Figures 1A, 1B:
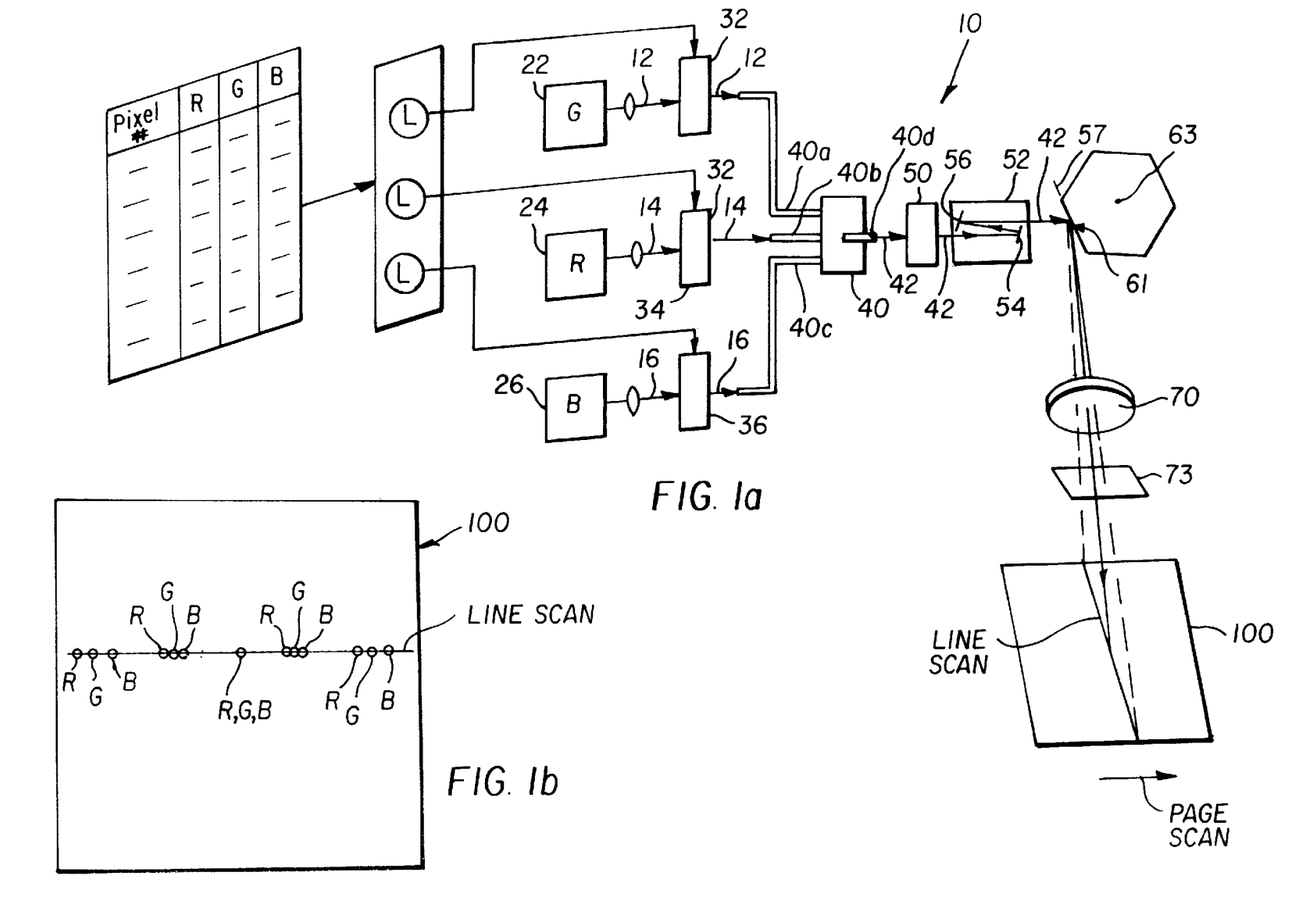
FIG. 1a is a schematic illustration of an embodiment of the printer system including an f-θ lens.
FIG. 1b illustrates schematically the color separation along a scan line on the surface of a photosensitive medium.

More specifically, reference is now made to FIG. 1a where there is illustrated a printer system 10 of the present invention. The printer system 10 is provided with a plurality of light sources 22, 24 and 26. The light sources 22, and 26 are laser sources that emit red, green and blue wavelength light beams 12, 14 and 16, respectively. These light beams 12, 14 and 16 are propagated to a plurality of accusto-optic modulators. In this embodiment the accusto-optical modulators 32, 34, and 36 are used as the light modulating means for modulating the light beams by image information. However, the light modulating means is not limited thereto. Other means for modulating the light beams may be employed.

Each of these accusto-optic modulators 32, 34, 36 modulates its associated light beam by changing its intensity according to the image data provided. This will be discussed in more detail in the "Lateral Color Correction" section of this specification. All three light beams are modulated simultaneously.

Figure 5:
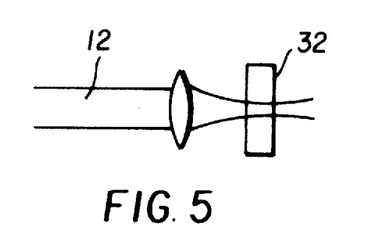
Figure 6:
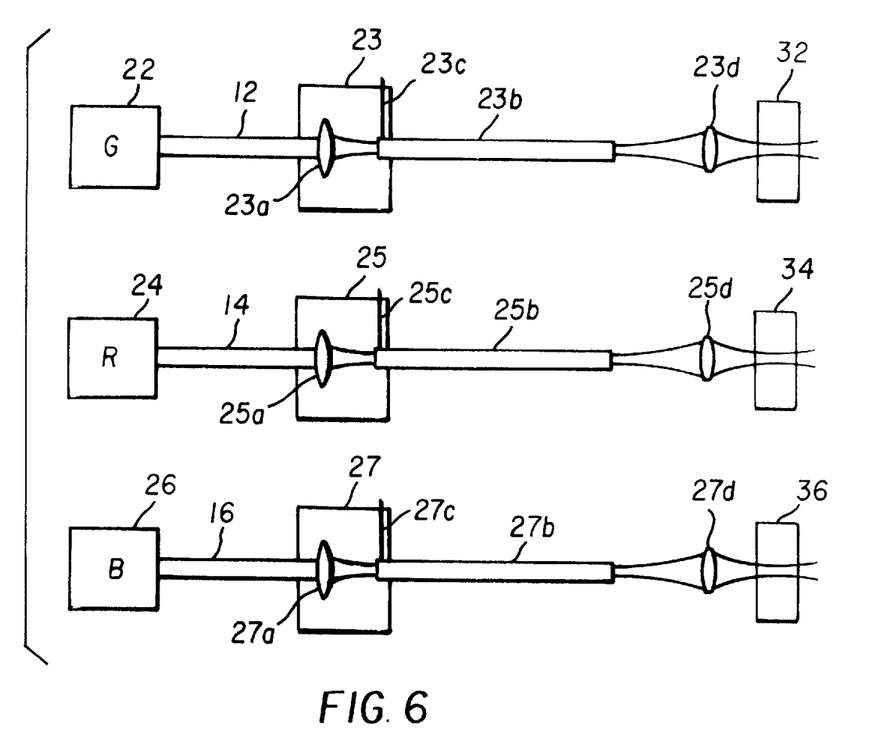

Two preferred embodiments are shown in FIGS. 5 and 6 to couple light beams 12, 14, 16 from laser sources to the modulators. FIG. 5 shows that a laser light beam 12 is directed to the modulator 32 through a focusing lens to form an appropriate beam waist size at the modulator. A similar arrangement is used for the light beams 14 and 16. FIG. 6 shows that, alternatively, the light beams 12, 14, 16 may be coupled to a single mode fiber through a fiber optic connector 23, 25, 27. The fiber optic connector consists of a first focusing lens 23a, 25a, 27a, a fiber 23b, 25b, 27b, and a fiber holder 23c, 25c, 27c with a mechanical motion capability to precisely locate and maintain the position of the fiber with respect to the laser beam 12, so as to maximize the amount of light coupled into the fiber. The beam waist formed on the end of the fiber 23b, 25b, 27b is re-imaged by a second lens 23d, 25d, 27d to form an appropriate beam waist at the modulator 32, 34, 36. More specifically, the 23b, 25b, 27b fiber circularizes the beam and a circular beam waist is then placed at the modulator 32, 34, 36.

The modulated light beams are optically combined into the single light beam 42 by an optical combiner such as a fiber optic multiplexor 40 (as shown in FIG. 1a). The fiber optic multiplexor 40 has appropriate fiber connectors (similar to fiber optic connectors 23, 25, 27) to couple the light beams exiting the modulators to the input fibers 40a, 40b, 40c of the fiber optic multiplexor 40. The fiber optic multiplexor 40 produces a beam waist of different size in each of the three colors at the output end of a beam combining fiber 40d. The radii of these waists at the exp(−2) power level in this embodiment are: 0.00189 mm at $\lambda$=532 nm (green color), 0.00172 mm at $\lambda$=457.9 nm (blue color) and 0.00237 mm at $\lambda$=685 nm (red color).

The combined beam (of red, blue and green components) exits the multiplexor 40 (at the output end of the fiber) as a single light beam 42 traveling along an optical axis 41 (which is common to the three components) and is directed first towards an apochromatic focusing lens 50, and then to the single set of beam shaping optics 52. The focusing lens 50 re-images the three beam waists (red, green, blue) produced at the output end of the fiber to the second set of larger size beam waists, and thereby decreases the divergence of the three combined light beams. The decreased divergence allows room for the beam shaping optics 52. The focusing lens 50 is apochromatic to insure that the three larger size (i.e., imaged) beam waists are located in a common plane. The three larger size beam waists produced by the focusing lens 50 constitute the input to the beam shaping optics 52.

The beam shaping optics 52 includes two cylindrical mirrors 54 and 56. The first cylindrical mirror 54 has power only in the page direction. The second cylindrical mirror 56 has power only in the line direction. In the preferred embodiment, the first cylindrical mirror 54 has concave radius of −119.146 mm in the x-z plane and is tilted in the x-z plane to deviate the single light beam by six degrees. The cylindrical mirror 56 has concave radius of −261.747 millimeters in the y-z plane and is tilted in the y-z plane to restore the light beam direction to the direction that it had prior to impinging on the cylindrical mirror 54. The cylindrical mirror 54 shapes the single light beam 42 so as to form three waists, one for each of the three wavelengths, in the page direction. These three waists are located essentially in the same plane 57 at or near the polygon facet 61. (See FIG. 1a). The cylindrical mirror 56 also shapes the single light beam so as to form three waists, one for each of the three wavelengths, in the line direction. These three waists are located essentially in the same plane 73 approximately one meter away behind the first vertex $V_1$ of the f-$\theta$ lens 70 (see FIG. 1c). The sizes and locations of these waists for each of the three wavelengths are provided in the "Beam Shaping and Pyramid Correction" section of the specification. The printer system of the present embodiment is convenient for use with any beam shaping optics producing waists at the locations given in the "Beam Shaping and Pyramid Correction" section of the specification.

As stated above, after being shaped by the shaping optics 52, the single light beam 42 is directed towards the polygon facet 61. Although the rotating polygon deflector is used in the preferred embodiment of the present invention, other deflectors or scanning means may be employed, so long as they are capable of deflecting the single light beam by a sufficient amount at the high speed required by the printer system. At the center of a scan line (here defined as 0° polygon rotation), the single light beam's angle of incidence on the polygon facet 61 is 30 degrees. The light beam 42 striking the polygon facet 61 and the single light beam 42 reflected from the polygon facet 61 form a plane which is normal to the direction of the polygon's axis of rotation 63. In other words, the angle of incidence has no component in the page direction.

Upon reflection of the polygon facet 61, the deflected light beam 42 enters the f-$\theta$ scan lens 70 as it is being scanned in a plane which is perpendicular to the axis of rotation 63 of the polygon. As described above, this single light beam 42 (also referred as an input beam when discussed in conjunction with the f-$\theta$ lens) comprises three coherent laser light beams having a wavelength of 458 nm, or 532 nm or 685 nm respectively, and has beam characteristics determined by the fiber optic multiplexor 40, focusing lens 50, and the beam shaping mirrors 54 and 56. The f-$\theta$ lens 70, illustrated in FIG. 1c, includes means for correcting the primary and secondary axial color aberration. The f-$\theta$ lens 70 itself is uncorrected for lateral color. Thus red, blue and green spots are separated as shown schematically in FIG. 1b. The overall printer system 10 is corrected for lateral color by modulating the three light beams at three different data rates. The f-$\theta$ lens 70 is corrected so that residual lateral color errors (after a linear electronic correction is applied) are insignificant. The detail description as the f-$\theta$ lens 70 is provided in the "F-$\theta$ Lens" section of this specification.

After passing through the f-$\theta$ lens 70, the deflected light beam 42 reflects off the conjugating cylindrical mirror 80 before it impinges on the photosensitive medium 100. (See FIGS. 2a, 2c, 2d). The cylindrical mirror 80 has optical power in X-Z plane (page direction) only. It corrects for pyramid error of the polygon's facets. This is discussed in more detail in the "Beam Shaping and Pyramid Correction" section of the specification. A plano fold mirror 84 can be placed between the f-$\theta$ lens 70 and the cylindrical mirror 80 or between the cylindrical mirror 80 and an image surface 99 in order to place the image surface 99 in a desirable location, where it (at least in line scan direction) coincides with the photosensitive medium 100. Such a fold mirror has no effect on the performance of the printer system. In the preferred embodiment of the present the image surface 99 is a plane.

As stated above, the fiber optic multiplexor 40 produces a beam waist of different size in each of the three colors at the output end of the fiber 40d. Because the f-$\theta$ lens 70 is designed to work with the light beam 42 after it has passed through a common apochromatic focusing lens and a common apochromatic beam shaping optics 52, the sizes of the three spots at the image surface 99 will be different for the three wavelengths. The spots at the image surface 99 will maintain the same relative sizes as the three waists located at the output end of the beam combing fiber 40d (of the fiber optic multiplexor 40). This variation in spot size between wavelengths does not significantly impact the perceived image quality.

In the preferred embodiment, the radii of the spots produced by the printer system 10 at the image surface 99 at the exp(−2) power level are: 0.035 mm at $\lambda$=532 nm, 0.032 mm at $\lambda$=457.9 nm, and 0.044 mm at $\lambda$=685 nm. As stated above, the image surface 99 of the f-$\theta$ lens 70 coincides with the location of the photosensitive medium 100. In this embodiment the photosensitive medium 100 is a conventional photographic paper. The paper rests on a planar support (not shown) which moves the paper in a predetermined direction. Writing with spots of this size onto photosensitive medium 100 over a scan line 12 inches long will produce sufficient resolution when the resulting prints are examined at a normal viewing distance. These spots (red, blue, green) refer to the images produced by the light beam on an instantaneous basis. These spots are produced in a series and their location changes with the rotation of the polygon. Each pixel on the page receives up to three spots, one for each color.

Beam Shaping

As discussed in the previous section, the cylindrical mirrors 54 and 56 of the beam shaping optics 52 direct the single light beam 42 containing all three colors toward the polygon facet 61 and cause the single light beam 42 to converge in both the line and page direction. By "beam shaping optics" we mean beam shaping optics that shape a light beam differentially in the line direction and in the page direction. In this embodiment of the printer system 10, the single light beam 42 converges to a point near the facet 61 in the X-Z or page direction, and toward a point approximately 1 meter behind the frontmost vertex $V_1$ of the f-θ lens 70 in the Y-Z or line direction. Thus, the beam shaping optics 52 adjusts the spot size and converges the single light beam 42 by different amounts in the page and line direction. The beam convergence is much faster in the page direction than the line direction, this arrangement having been found to allow superior correction of the f-θ lens 70 and other post-polygon optics.

More specifically, in the preferred embodiment, the focusing lens 50 and the beam shaping optics 52 produce a shaped light beam which converges in such a manner as to produce a green, page direction waist 22.904 mm in front of the first vertex $V_1$ of the f-θ lens 70 (i.e., this beam waist is located between the polygon facet 61 and the f-θ lens) and a green, line direction waist 995.7 mm behind the first vertex $V_1$ of the f-θ lens 70 (the line direction beam waist is located between the f-θ lens 70 and the image surface 99). The size of the waists may be adjusted by the beam shaping optics depending on the spot size desired at the image surface. For example the exp(−2) power radius of the green waist in the line direction may be 0.114 mm and the exp(−2) power radius of the green waist in the page direction may be 0.0396 mm.

Similarly, the focusing lens 50 and the beam shaping optics 52 produce a shaped light beam 42 which converges in such a manner as to produce a blue, page direction waist 22.893 mm in front of the first vertex $V_1$ of the f-θ lens 70 and a blue, line direction waist 995.8 mm behind the first vertex of the f-θ lens. For example, the exp(−2) power radius of the blue waist in the line direction may be 0.104 mm and the exp(−2) power radius of the blue waist in the page direction may be 0.036 mm.

Similarly, the focusing lens 50 and the beam shaping optics 52 produce a shaped light beam which converges in such a manner as to produce a red, page direction waist 22.790 mm in front of the first vertex $V_1$ of the f-θ lens 70 and a red, line direction waist 995.9 mm behind the first vertex of the f-θ lens. For example, the exp(−2) power radius of the red waist in the line direction may be 0.144 mm and the exp(−2) power radius of the red waist in the page direction may be 0.0495 mm.

Polygon

The f-θ lens 70 of the preferred embodiment is designed to work with a variety of rotating polygons. This makes it particularly suitable for use with a dual format pre-objective scanner of the type described in the U.S. patent application Ser. No. 08/771,367, filed Dec. 16, 1996 in the name of Michael Harrigan, Badhri Narayan and Drew Summers which is incorporated by reference herein. It is particularly suitable for use with 10 facet polygons having an inscribed radius between 32.85 mm and 40.709 mm. These polygons are rotated by ±13.5 degrees to produce a scan line 12 inches long at the image surface 99.

The f-θ lens 70 also works well with 24 facet polygons having an inscribed radius between 38.66 mm and 44 mm. These polygons are rotated by ±5.625 degrees to produce scan lines 5 inches long at the image surface 99.

F-θ Lens

The lens 70 is arranged in the optical path of the printer system 10 as shown in FIGS. 2a–d.

Figure 1C:
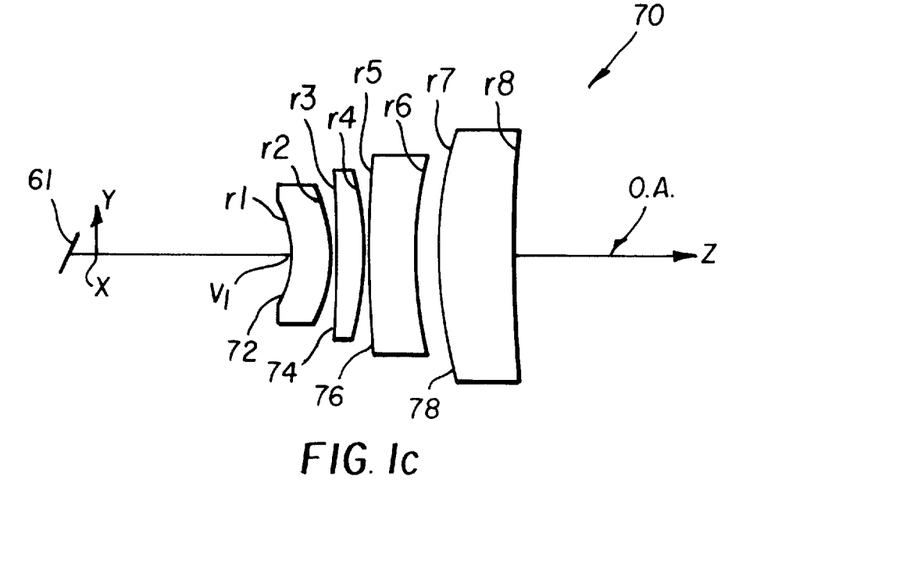

As shown in FIG. 1c, the optical axis O. A. of the f-θ lens 70 extends in a direction referred to herein as the Z direction. When the polygon rotates (for line scanning) the light beam 42 is scanned through the Y-Z meridian. (See FIGS. 3a–3c). The cross-scan (also referred to as the page direction) is in the X direction.

The f-θ lens 70 described herein is particularly suitable for use in the laser printer system 10. Due to the lateral color present in the f-θ lens 70, the printer system 10 simultaneously produces three spatially separated scanning spots at the image surface 99. Each of three spots contains energy in one of the three laser wavelengths. This separation is compensated for in a manner described in the "Lateral Color Correction" section of this specification. To summarize, the spots are properly superimposed on a photosensitive medium when the data rates at which the three light beams are modulated are linearly adjusted to compensate for the lateral color of the f-θ lens 70.

Ideally, the lateral color should be completely corrected with no residual errors by using three different data rates to move data between the digital image store and the laser modulator control circuitry. The spots should ideally travel in a straight line, at uniform velocities (as the polygon is rotated with uniform angular velocity), and should not significantly change their size and shape as they travel down the line. If necessary, the variation in the spot velocities can be compensated for by adjusting the data rate as the spots move across the scan line. The spots should have approximately circular shapes, with energy distributions which are approximately gaussian. The spot diameter at the exp (−2) level should be about 60–105 μm (in green light) in order to achieve sufficient resolution at the photosensitive medium, the smaller size being necessary to achieve overprinting of fine text on a picture. It is preferred that this spot diameter be 64–88 μm.

A further requirement of an f-θ scan lens 70 of the preferred embodiment is that it be readily manufacturable at a reasonable cost. This requires that the lens have spherical surfaces on relatively low cost glass.

Figure 2A:
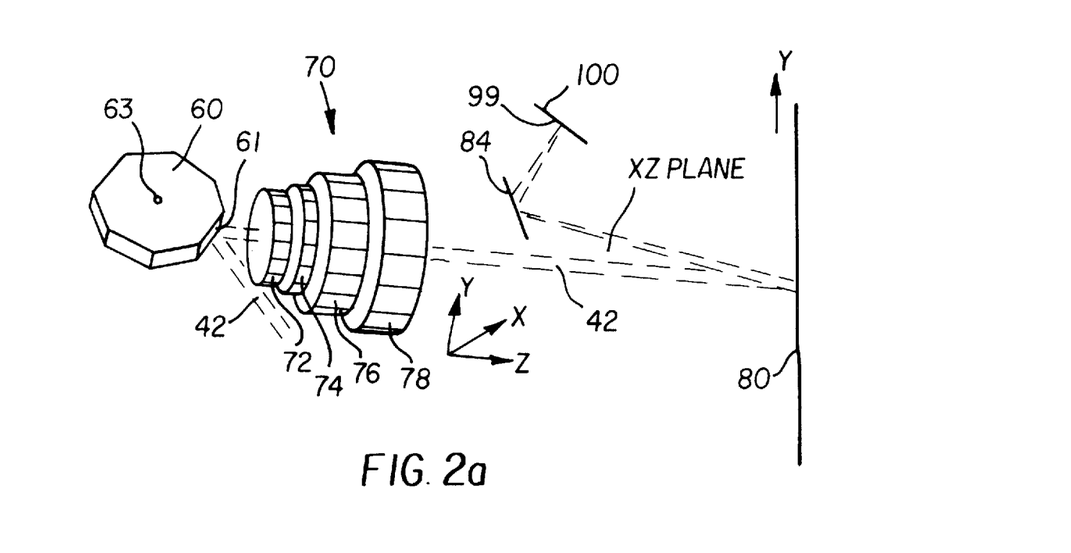
FIG. 2a is a schematic elevational view showing the f-θ lens of FIG. 1c in combination with a plano mirror and a cylindrical mirror, and a deflected light beam going through the F-θ lens and striking the photosensitive medium.
Figure 2B:
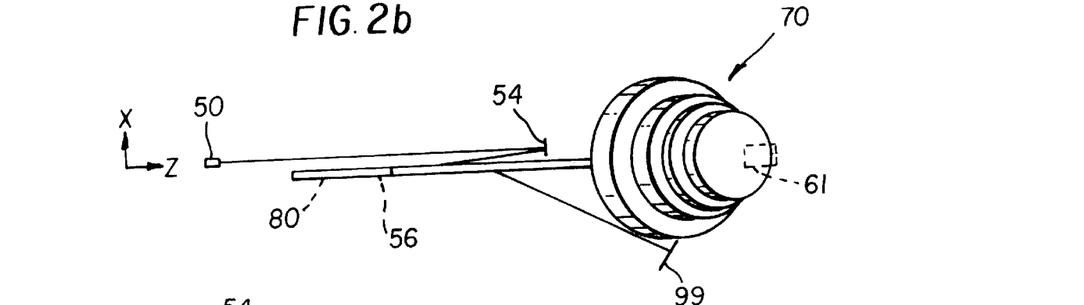
FIGS. 2b–2d are three perspective views of the f-θ of FIG. 1c, pre-polygon beam shaping and focusing optics, post-polygon cylindrical mirror, and an associated image surface.
Figures 2C, 2D:
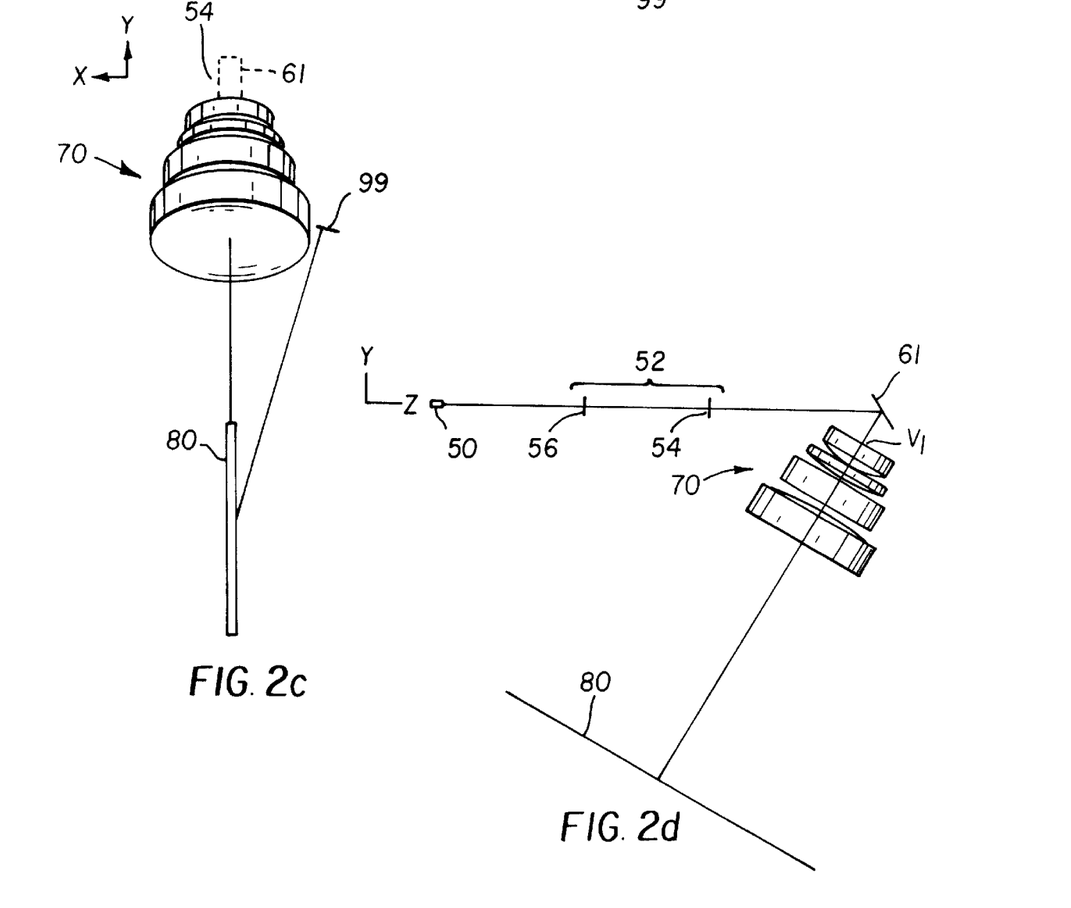

The f-θ lens 70 satisfies all of the above requirements. In FIGS. 1c and 2a there is shown the f-θ lens 70 which is constructed in accordance with the present invention. In the present embodiment of the present invention, the f-θ lens includes four lens components arranged along an optical axis. They are: a first lens component 72 of negative optical power, a second lens component 74 of positive optical power, a third lens component 76 of negative optical power, and a fourth lens component 78 of positive optical power.

The lens components satisfy the following relationships:

$-1.6 < f_1/f < -0.9;$ $0.38 < f_2/f < 0.5;$ $-0.65 < f_3/f < -0.50;$ $0.73 < f_4/f < 0.9,$ where $f_1$ is the focal length of the first lens component, $f_2$ is the focal length of the second lens component, $f_3$ is the focal length of the third lens component, $f_4$ is the focal length of the fourth lens component, and f is the focal length of the f-θ lens 70. The lens component 72 is a meniscus negative element, concave toward the polygon side. Lens component 74 is a meniscus positive lens element, also concave toward the polygon. Lens component 76 is a meniscus negative lens element, concave toward the image surface 99. Lens component 78 is a meniscus positive lens element, also concave toward the image surface 99. In the exemplary f-θ lens 70, the lens elements are formed of Schott glass with the lens element 72 being an PK-51A type, the lens element 74 being LAK-21 glass, the lens element 76 being an SFL-56 glass, and the lens element 78 being an F-2 type glass. The f-θ lens 70 is apochromatic, that is it is corrected for both the primary and the secondary axial color at a wavelength of 458 nm, 532 nm and 685 nm. In this embodiment, the first lens component 72 is a single lens element satisfying the following equations:

$Vd_1 > 65;$ and $P_{g,F;1} > 0.53,$ where $Vd_1$ is the V-number of the first lens component material and $P_{g,F;1}$ is its relative partial dispersion.

The details of the elements in lens 70 are shown in TABLE 1A.

In this table, the radii of curvature (r1–r8) and thicknesses of the lens elements are in millimeters.

TABLE 1A

| SURF | RADIUS | THICKNESS | INDEX | V NUMBER |
|---|---|---|---|---|
| Entrance Pupil | | 24.00 | Polygon facet | |
| 1 | −33.0678 | 10.634 | 1.529 | 77.0 |
| 2 | −44.642 | 0.925 | AIR | |
| 3 | −341.050 | 7.654 | 1.641 | 60.1 |
| 4 | −85.6131 | 0.836 | AIR | |
| 5 | 423.736 | 12.550 | 1.785 | 26.1 |
| 6 | 129.480 | 6.034 | AIR | |
| 7 | 139.081 | 19.689 | 1.620 | 36.4 |
| 8 | 403.727 | | | |

The following tables 1B–1D show the f-θ compliance and the relative spot velocity achieved in the green, red and blue light for the f-θ lens when it is used with a 10 facet polygon having an inscribed radius of 32.85 mm.

TABLE 1B

F-Theta compliance and instantaneous spot velocity data:
$\lambda = 532$

| CFG NBR | ROT ANGLE | IDEAL RAYHT | ACTUAL RAYHT | DELTA RAYHT | PERCENT ERROR | REL VEL | -LOG10 REL VEL |
|---|---|---|---|---|---|---|---|
| 1 | 0.000 | 0.000 | 0.000 | 0.000 | 0.000 | 1.0000 | 0.0000 |
| 2 | 4.500 | −51.265 | −50.089 | 1.175 | −2.293 | 1.0104 | −0.0045 |
| 3 | 9.000 | −102.530 | −101.282 | 1.248 | −1.217 | 1.0440 | −0.0187 |
| 4 | 13.500 | −153.794 | −154.644 | −0.850 | 0.553 | 1.0948 | −0.0393 |
| 5 | −4.500 | 51.265 | 50.149 | −1.116 | −2.176 | 1.0129 | −0.0056 |
| 6 | −9.000 | 102.530 | 101.526 | −1.004 | −0.979 | 1.0492 | −0,0208 |
| 7 | −13.500 | 153.794 | 155.209 | 1.415 | 0.920 | 1.1023 | −0.0423 |

TABLE 1C $\lambda = 457.9$

| CFG NBR | ROT ANGLE | IDEAL RAYHT | ACTUAL RAYHT | DELTA RAYHT | PERCENT ERROR | REL VEL | -LOG10 REL VEL |
|---|---|---|---|---|---|---|---|
| 1 | 0.060 | 0.000 | 0.000 | 0.000 | 0.000 | 1.0000 | 0.0000 |
| 2 | 4.500 | −51.237 | −50.059 | 1.179 | −2.300 | 1.0105 | −0.0045 |
| 3 | 9.000 | −102.474 | −101.224 | 1.251 | −1.221 | 1.0441 | −0.0188 |
| 4 | 13.500 | −153.712 | −154.561 | −0.849 | 0.552 | 1.0949 | −0.0394 |
| 5 | −4.500 | 51.237 | 50.119 | −1.118 | −2.183 | 1.0130 | −0.0056 |
| 6 | −9.000 | 102.474 | 101.470 | −1.005 | −0.981 | 1.0494 | −0.0209 |
| 7 | −13.500 | 153.712 | 155.132 | 1.420 | 0.924 | 1.1025 | −0.0424 |

TABLE 1D $\lambda = 685$

| CFG NBR | ROT ANGLE | IDEAL RAYHT | ACTUAL RAYHT | DELTA RAYHT | PERCENT ERROR | VEL | -LOG10 REL VEL |
|---|---|---|---|---|---|---|---|
| 1 | 0.000 | 0.000 | 0.000 | 0.000 | 0.000 | 1.0000 | 0.0000 |
| 2 | 4.500 | −51.321 | −50.145 | 1.177 | −2.293 | 1.0104 | −0.0394 |

TABLE 1D-continued $\lambda = 685$

| CFG NBR | ROT ANGLE | IDEAL RAYHT | ACTUAL RAYHT | DELTA RAYHT | PERCENT ERROR | VEL | -LOG10 REL VEL |
|---|---|---|---|---|---|---|---|
| 3 | 9.000 | −102.643 | −101.393 | 1.250 | −1.218 | 1.0440 | −0.0187 |
| 4 | 13.500 | −153.964 | −154.816 | −0.851 | 0.553 | 1.0950 | −0.0045 |
| 5 | −4.500 | 51.321 | 50.205 | −1.117 | −2.176 | 1.0129 | −0.0056 |
| 6 | −9.000 | 102.643 | 101.637 | −1.005 | −0.980 | 1.0491 | −0.0208 |
| 7 | −13.500 | 153.964 | 155.381 | 1.417 | 0.920 | 1.1025 | −0.0424 |

If necessary, the variation in the spot velocities can be compensated for by adjusting the rate at which data in the digital image store (described in the "Lateral Color Correction" section) is moved to the circuitry controlling the laser modulators. The adjustment amount is the same for each of the modulators.

The following Table 2 shows how the spots grow as the polygon is rotated and the spot moves across the scan line. This data is for a 10 facet polygon having an inscribed radius of 32.85 mm. A polygon rotation of ±13.5 degrees corresponds to a scan position of approximately ±6 inches at the image surface 99.

TABLE 2

$\frac{1}{e^2}$ spot sizes (mm) at image surface computed from astigmatic Gausssian beam trace using the following $\frac{1}{e^2}$ waist radii at an object plane:

$\lambda = 532$, $\omega = .00189$; $\lambda = 457.9$, $\omega = .00172$; $\lambda = 685$, $\omega = .00237$.
Effects of beam truncation are not included in this computation.

| POLYGON ROTATION | | 13.500° | 9.000° | 4.500° | 0.000° | −4.500° | −9.000° | −13.500° |
|---|---|---|---|---|---|---|---|---|
| $\lambda = 532$ | $\omega y$ | 0.0390 | 0.0371 | 0.0359 | 0.0355 | 0.0359 | 0.0371 | 0.0390 |
|  | $\omega x$ | 0.0359 | 0.0355 | 0.0353 | 0.0352 | 0.0353 | 0.0356 | 0.0358 |
| $\lambda = 457$ | $\omega y$ | 0.0360 | 0.0340 | 0.0328 | 0.0325 | 0.0328 | 0.0340 | 0.0357 |
|  | $\omega x$ | 0.0329 | 0.0324 | 0.0322 | 0.0322 | 0.0323 | 0.0325 | 0.0328 |
| $\lambda = 685$ | $\omega y$ | 0.0490 | 0.0467 | 0.0452 | 0.0450 | 0.0452 | 0.0467 | 0.0489 |
|  | $\omega x$ | 0.0447 | 0.0443 | 0.0441 | 0.0441 | 0.0442 | 0.0444 | 0.0446 | where $\omega y$ = line direction $\frac{1}{e^2}$ spot radius and $\omega x$ = page direction $\frac{1}{e^2}$ spot radius

Pyramid Error Correction

Scanning systems using a rotating polygon deflectors are subject to an image defect known as banding, which is most easily seen in areas of the image where it is free of subject detail, i.e., a blank wall or a cloud free sky scene. Light and dark bands, which are not part of the desired image, will appear in these areas. These bands are caused by repetitive non-uniform spacing of the scan lines. The banding is caused by a facet, or facets, on the polygon which are tilted slightly out of position. Thus, every time the facet which is out of position comes around, it will cause the light beam to move ever so slightly out of the nominal light beam plane— i.e., the light beam plane formed by a rotating light beam in the absence of any pyramid error. After going through the f-θ lens, this misplaced light beam will land in a slightly different position on the image surface, generating what is known as "cross-scan" error, since the position error is in a direction which is perpendicular to the scan line. An f-θ lens must function with the other optical elements in the printer system to produce an image which is free from banding when a "good" polygon is used, that is, a polygon in which pyramidal angle errors on the polygon facets do not exceed ±10 arc seconds, as measured with respect to the axis of rotation of the polygon.

In the preferred embodiment of the present invention, the pyramid error is corrected by keeping the polygon facet 61 conjugate with the image surface 99 in the page meridian. This conjugation is achieved by the conjugating cylindrical mirror 80 working in conjunction with f-θ lens 70. Thus, there is a focal point (beam waist) at both the polygon facet 61 and at the photosensitive medium 100, and the polygon facet is thereby conjugated to the photosensitive medium 100. As a result, if the polygon facet 61 is tilted slightly in the X-Z meridian, that is, around the "object" point, the path of the rays through the printer system 10 is slightly different from that shown in the figure, but the rays all go to the same "image" point, and the cross-scan error is zero.

The conjugation condition described above imposes requirements on the beam shaping optics. Conjugation of the polygon facet 61 and the image surface 99 in the page meridian implies that in the page meridian, a beam waist (for each wavelength) is located at or adjacent to both locations (i.e., at or near the polygon facet 61, and at or near the image surface 99). Hence, the beam shaping optics 52 must produce a beam waist in the page direction at or near the polygon facet 61. This is achieved in the current design as is discussed in the "Beam Shaping" section. It is preferred that the beam waist in the page direction be located less than from the polygon facet 61 (where f is the focal length of the f-θ lens).

$$\frac{1f}{100}$$

The degree of convergence (of the single light beam 42) in the line direction is not similarly constrained. In the present embodiment, the beam shaping optics 52 converge the single light beam 42 in the line direction to form a beam waist behind the rear focal point of the f-θ lens 70. It is preferred that the beam waist in the line direction at a distance be at least 1/3 f behind the first vertex $V_1$ of the-θ lens. In the printer system 10 the distance between the rear focal point of the f-θ lens and the waist location is approximately equal to the focal length of the f-θ lens 70. More specifically, the f-θ lens 70 has a focal length of 426.4 mm and the line direction waist formed by the beam shaping optics 52 is located 488.9 mm behind the rear focal point. This arrangement has been found to allow superior correction of the f-θ lens and other post-polygon optics, as well as providing a compact system.

The conjugating cylindrical mirror 80 is located between the f-θ lens 70 and the photosensitive medium 100. As stated above, it corrects for the pyramid error of the polygon facets by conjugating, in the page meriodinal, the polygon facet 61 with the image surface 99. This cylindrical mirror 80 has a concave radius (in the page direction) of 190.500 mm and is located 153.053 mm behind the last vertex of the f-θ lens. The cylindrical mirror 80 is tilted by 7 degrees and deviates the single light beam 42 by 14 degrees. The image surface 99 is located 162.96 mm behind the cylindrical mirror 80, the distance being measured along the deviated light beam. As mentioned above, various plano fold mirrors 84 may be placed in the scanning system without affecting its performance.

Figure 3A:
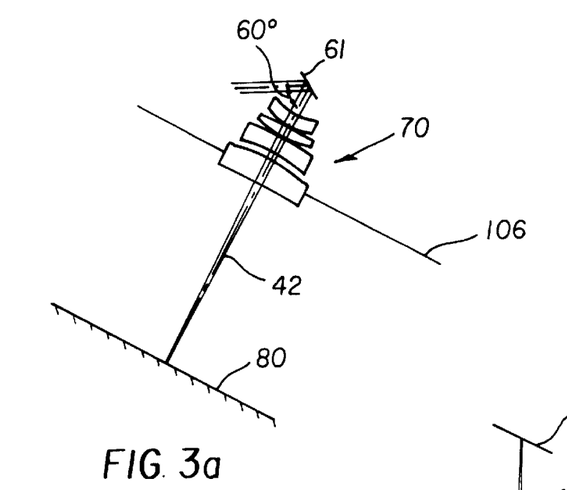
Figure 3B:
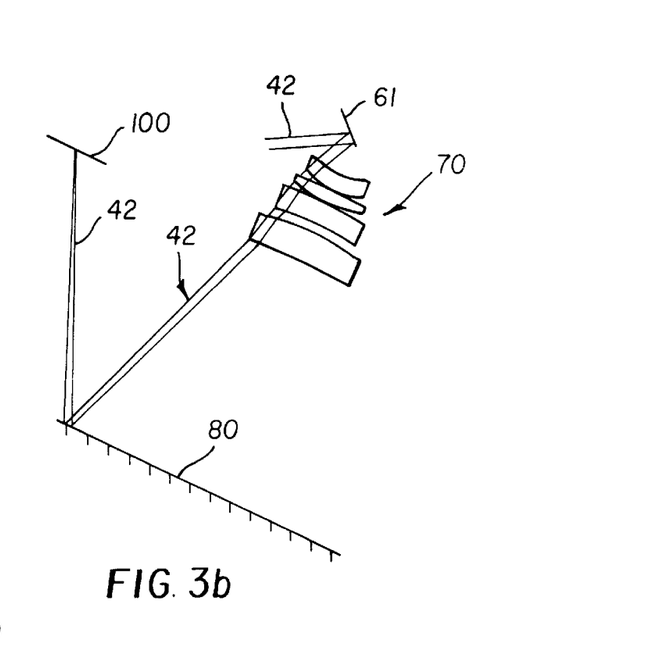
Figure 3C:
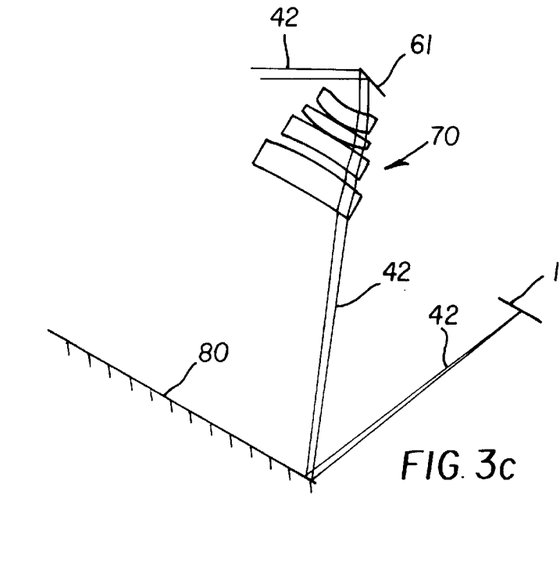

FIGS. 3a, 3b, 3c show the position of the light beam 42 on the photosensitive medium 100 (located at the image surface 99) for polygon rotations of +13.5, 0, and −13.5 degrees respectively. This represents scan angles of +27,0, and −27 degrees, respectively.

More specifically, in Table 3, the computed cross-scan image displacements for the chief (central) rays of the light beam (at wavelengths of 532 nm, 457 nm and 685 nm) are tabulated. It will be seen that the cross-scan displacements are certainly well within acceptable limits.

Table 3 shows the cross-scan displacement due to 10 arc seconds of pyramid error on polygon facet. The displacement units are micrometers.

TABLE 3

CROSS-SCAN DISPLACEMENT

| POLYGON ROTATION | FIELD ANGLE | λ = 532 nm | λ = 457 nm | λ = 685 nm |
|---|---|---|---|---|
| 4.5° | 9.0° | −0.0204568 | −0.0103607 | −0.0299763 |
| 9.0° | 18.0° | −0.0210595 | −0.0113009 | −0.0301466 |
| 13.5° | 27.0° | −0.0327880 | −0.0235740 | −0.0411589 |
| −4.5° | −9.0° | −0.0189723 | −0.0079102 | −0.0294039 |
| −9.0° | 18.0° | −0.0209200 | −0.0091726 | −0.0318579 |
| −13.5° | 27.0° | −0.0465809 | −0.0344084 | −0.0576246 |
| none | 0.0° | −0.0202603 | −0.0097542 | −0.0302057 |

Axial Color Aberration

There are two kinds of color aberrations in any lens system: axial color and lateral color. Axial color causes light of different wavelengths to come to a focus at different distances from the rear surface of the lens system. Since axial color is a focus-related phenomenon, it is caused not only by aberrations in a lens system itself but also by the vergence of the input light beam to the lens system.

A fiber optic multiplexor combining the three beams in a three-color laser printer is described in U.S. patent application Ser. No. 08/342,958, filed Nov. 21, 1994, entitled USING OPTICAL FIBER MULTIPLEXER TO COMBINE LIGHT BEAMS IN A LASER PRINTER, by Chih-Li Chuang & Sanwal Sarraf. After the combination by the fiber optic multiplexor, the single light beam 42 passes through a common optical system comprising focusing optics, beam shaping optics, polygon, f-θ lens, cylindrical corrugating mirror, and optional plano fold mirrors until it reaches the image surface.

Figure 4:
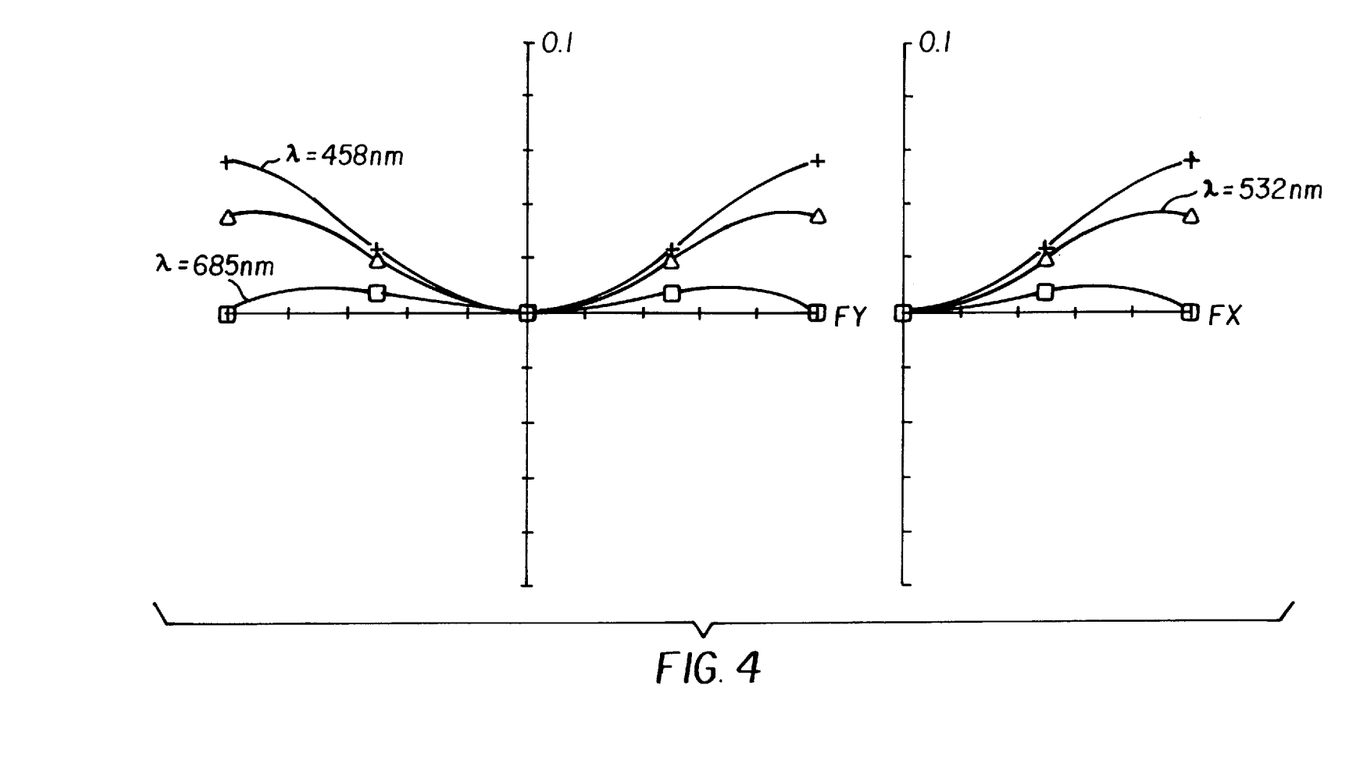
FIG. 4 is a an aberration plot showing the optical path differences at the center of scan line in all three wavelengths.

In the printer system 10, the line direction vergence of the green, blue, and red light beams cannot be adjusted independently because the beam shaping optics 52 is common to the three (combined) light beams. This makes the correction of the axial color in the optical system more difficult. For the printer system 10, the axial color must be corrected when the three light beams have essentially the same vergence. This is what has been done in the f-θ lens 70, as is shown in the OPD plots in FIG. 4, which correspond to f-θ lens performance at the center of the line scan. The construction of the f-θ lens 70 is disclosed in the "F-θ lens" section of the application.

The axial color of the optical system in the page direction must be corrected between the polygon facet and the image surface, in order to prevent color banding due to pyramid errors. Otherwise, the pyramid error will only be corrected in a single color. In the printer system 10, the axial color is corrected in both meridians, all the elements are spherical, a costly cemented cylindrical doublet is unnecessary, and the pyramid error is corrected with a conjugating cylindrical mirror.

Lateral Color Correction

As stated previously, the lateral color aberration of the F-θ lens 70 is uncorrected. Lateral color is the variation in image height of focused spots having different wavelengths, or colors, taken in a specified image surface. For example, in normal photographic objectives for use in color photography, lateral color is typically measured by Y'(at $\lambda_1$=486.1 nm) −Y'(at $\lambda_2$=656.3 nm); this is the difference in image height, taken in the gaussian focal plane for 546.1 nm, between the blue point image and the red point image. Lateral color, as opposed to axial color, only occurs away from the optical axis, out in the field of the lens. Usually, the farther away from the axial image point, the greater the amount of lateral color. Thus, the largest amount of lateral color often occurs near the edge of the field of view of the lens.

The lateral color in the printer system 10 is corrected by modulating the three light beams at three different data rates. To understand this, consider the following hypothetical example: Suppose that the lateral color in an f-θ lens is such that for a given amount of polygon rotation the green light beam intercepts the image surface at a location 100 pixels high whereas the red light beam intercepts the image surface at a location 101 pixels high and the blue light beam intercepts the image surface at a location 99 pixels high. For example, if the printer worked at 512 dots per inch, the blue and green spots would be separated by a distance $d_1=\frac{1}{512}$ inch and the red and green spots would be separated by a distance $d_2=\frac{1}{512}$ inch. The rate at which data is moved from a digital image store to the circuitry controlling the laser modulators is determined by three data clocks. One clock controls the data rate for the green channel, a second controls the data rate for the blue channel, an a third controls the data rate for the red channel. If these three clocks are run at the same rate, then, at any instant in time, the three laser intensities correspond to the required green, blue and red intensity values for the same pixel. Due to the spot separation produced at the image surface by the lateral color in the f-θ lens, the image recorded on the photosensitive medium will show color fringing at an image location of 100 pixels. More specifically, there will be color fringing of two pixels between red and blue, one pixel between green and red and one pixel between green and blue.

Now suppose that the blue data clock is run at a frequency (i.e., data rate) $f_B$ which is 99% of the green clock frequency $f_G$ and that the red clock is run at a frequency $f_R$ which is 101% of the green clock frequency. At the given amount of polygon rotation, the green light beam will intercept the image surface at a location 100 pixels high and the modulation of the light beam is appropriate to produce the exposure of the 100th pixel. Likewise, at this same polygon rotation, the red light beam still intercepts the image surface at a location 101 pixels high. However, since the red clock is being run at 101% of the frequency of the green clock, the red light beam is now correctly data modulated to give the proper exposure for the 101st pixel. Similarly the blue light beam remains 99 pixels high, but the blue laser light is data modulated to give the proper exposure for the 99th pixel. Therefore, there will be no color fringing at the 100th pixel. Thus, in the printer system 10, the data rates $f_B$, $f_G$ and $f_R$ are not the same. More specifically, the data rates are $f_B=k_1 \times f_G$, $f_R=k_2 \times f_G$, where $k_1$ and $k_2$ are constants chosen to compensate for spot separation during the line scan.

In any laser printer system, there is a detection procedure to determine a specific starting location for each line on the photosensitive medium. In a printer system 10, this is done by utilizing a "split" (dual) detector and the (unmodulated) red light beam to generate the initial start up pulse. More specifically, the split detector detects the presence of the light beam and from its location (with respect to the beginning of the line), determines the time delays needed for starting of the modulation of each of the three light beams, so that the appropriate pixel at the beginning of the line scan is exposed with the light beam carrying the proper data information.

A potential problem remains that the same clock rates which produced good results for an image height of 100 pixels might still produce color fringing at other image heights. However, in the printer system 10, these residual lateral color errors have been corrected in the f-θ lens 70 so that the worst residual error (due to the lateral color aberration) over the entire scan line is less than 20% of the size of a green pixel. This is shown in tables 2 and 4. Table 2 shows the spot size across the scan line. Table 4 shows the residual lateral color when the light beams are modulated at the rates shown at the bottom of the table. Both of these tables are for a 10 facet polygon with an inscribed radius of 32.85 mm. Similar results hold for the other 10 facet polygon sizes. The results for the 24 facet polygons are much better.

TABLE 4

Difference in line direction image position (in millimeters) for red, green and blue colors with red, green and blue pixel clocks in drive electronics adjusted in the ratio of 1.0011:1.0000:0.99946

| ROT ANGLE | (λ =457) − (λ = 532) Residual Error (Blue − Green) | (λ = 685) − (λ = 532) Residual Error (Red − Green) |
|---|---|---|
| 4.500 | 0.003 | 0.001 |
| 9.000 | 0.003 | 0.003 |
| 13.500 | 0.001 | −0.002 |
| −4.500 | −0.003 | −0.001 |
| −9.000 | −0.001 | −0.002 |
| −13.500 | 0.006 | 0.002 |

Green λ = 532 nm; Blue λ = 457.9 nm; Red λ = 685 nm

In a laser printer of a type which can incorporate the f-θ lens of the present invention, the system parameters can be as follows:

Wavelengths: 532, 457.9, and 685 nm
Scan length: 12 inches
Polygon Duty Cycle: 0.75
Polygon inscribed radius: 32.85 through 40.709
Number of polygon facets: 10
Total Scan angle: 54 degrees. (±27 degrees with respect to the optical axis; ±13.5 degrees of polygon rotation)
Light beam input angle onto polygon facet: 60 degrees from optical axis of f-θ lens (30 degree angle of incidence on polygon facet)
Desired gaussian beam radius at the exp(−2) power point: 0.035 mm at λ=532 nm.

In a laser printer of a type which incorporates the f-θ lens 70 of the present invention, the system parameters can also be as follows:

Wavelengths: 532, 457.9, and 685 nm
Scan length: 5 inches
Polygon Duty Cycle: 0.75
Polygon inscribed radius: 38.66 through 44.00
Number of polygon facets: 24
Total Scan angle: 22.5 degrees. (±11.25 degrees with respect to the optical axis; ±5.625 degrees of polygon rotation)
Light beam input angle onto polygon facet: 60 degrees from optical axis of f-θ lens (30 degree angle of incidence on polygon facet)
Desired gaussian beam radius at the exp(−2) power point: 0.051 mm at 532 nm.

As stated above, the f-θ lens 70 itself is not corrected for lateral color. Correction of the lateral color in the scanner requires running the green, blue, and red clocks modulating the lasers in the ratio 1:000:0.99946:1.0011.

As disclosed in the "Axial Color Aberration" section of this specification, the f-θ scan lens 70 by itself is corrected for primary and secondary axial color. This is a requirement for this type of scanner because the beam shaping optics 52 is common to the three light beams. In the X-Z meridian, the f-θ scan lens conjugates the polygon facet to the image surface, in all three wavelengths: this requires the use of an auxiliary cylindrical mirror element, having power in only the X-Z meridian. Assuming the "object" is at the polygon facet, the axial color in the X-Z meridian for the f-θ lens 70 is zero; it is also zero for the cylindrical mirror and, hence, the conjugation holds at all three wavelengths.

The invention has been described in detail with particular reference to the preferred embodiment thereof, but it will be understood that variations and modifications can be effected within the spirit and scope of the invention. For example, other laser sources producing red, green and blue light beams in wavelengths other than 458 nm, 532 nm or 685 nm may be also utilized. Changing the wavelengths will change the ratios between the corresponding data rates.

PARTS LIST

Printer system 10
Digital info store 20
3 laser sources 22, 24, 26
Light beam 12, 14, 16
3 modulators 21, 34, 36
Beam combiner 40
Single light beam 42
Focusing lens 50
Beam shaping optics 52
Light deflector (polygon) 60
Polygon Facet 61
f-θ lens 70
four lens components 72, 74, 76, 78
Cylindrical mirror 80
Flat mirror 84
Processor unit 90
means for reading 92
means for controlling 94
Image surface 99
Photosensitive medium 100

What is claimed is:

1. A printer system for printing on an associated photosensitive medium, said printer comprising:
    (a) an f-θ lens producing lateral color aberration;
    (b) three laser light sources, each producing a light beam for use with said f-θ lens; and
    (c) three modulators modulating these laser light beams at different data rates from one another, the ratio of the different data rates compensating for the lateral color aberration produced by the f-θ lens.

2. A printer system for printing on an associated photosensitive medium, said printer comprising:
    (a) an image information store, said store containing three values for each pixel in the image to be created, each of three values representing the required level of intensity of light in one of three required wavelengths, said wavelengths matching the spectral sensitivity of the associated photosensitive medium so as to produce full color images when impinging on the associated photosensitive medium;
    (b) a processor processing said values;
    (c) three laser light sources each generating a light beam, each of said light beams being of said required wavelength;
    (d) three modulators driven by the processor, each of said modulators modulating intensity of one of said light beams by image data at different data rates from one another, and together providing three modulated light beams;
    (e) a beam combiner combining three modulated light beams into a single light beam;
    (f) a light deflector deflecting said single light beam and, thereby providing a deflected light beam;
    (h) an axial color achromatic f-θ lens (i) intercepting the deflected light beam, (ii) focusing the deflected light on the associated photosensitive medium, and (iii) producing lateral color aberration in a line scan direction, thereby placing different wavelength portions of the focused beam into three spots along a line scan direction on the associated photosensitive medium, said spots having predetermined separations compensated for by the ratios of said data rates to substantially overcome lateral color aberration in the f-θ lens.

3. A printer system according to claim 2 wherein said processor includes means for
    (a) determining for each position of the light deflector where said spots will appear on the associated photosensitive medium; and
    (b) selecting pixels from the image information store that correspond to these spots.

4. A printer system according to claim 3 further comprising:
    a support means supporting said associated photosensitive medium in a flat plane; and
    a conjugating cylindrical mirror (a) having a concave radius in page direction, (b) being located between said f-θ lens and the associated photosensitive medium, (c) receiving the single light beam from said f-θ lens, and (d) directing it onto the associated photosensitive medium.

5. A printer system for printing on an associated photosensitive medium, said printer system comprising:
    (a) a digital image information store, said store containing three values for each pixel in the image to be created, each of three values representing the required level of intensity of the light in one of the three required visible wavelengths, said wavelengths matching the spectral sensitivity of the associated photosensitive medium so as to produce full color images when impinging on the associated photosensitive medium;
    (b) three laser light sources each generating a light beam, having a respective one of said wavelengths;
    (c) three modulators, each of said modulators modulating the intensity of a respective light beam by image data;
    (d) a beam combiner combining said three modulated light beams into a single light beam;
    (e) a light deflector deflecting said single light beam and thereby providing a deflected light beam;
    (f) an axial color achromatic f-θ lens (i) intercepting said deflected light beam, (ii) focusing said deflected light beam on said associated photosensitive medium and (iii) producing lateral color aberration in a line scan direction, thereby placing different wavelength portions of the focused beam into three different spots located along a line scan direction on the associated photosensitive medium; and
    (g) a processor unit including
        (i) means for accessing said values in the image information store for a first, second and a third pixel in a line scan direction, and
        (ii) means for controlling the intensity of each of said three light beams via the use of said modulators, such that the intensity of each light beam corresponds respectively to a different one of said values for each one of said first, second and a third pixels appropriate to the wavelength of the beam,
        (iii) means for modulating each of said beams at different data rates, the data rates ratios compensating for the separation of spots on the print media produced by the lateral color aberration in the f-θ lens.

6. A printer system according to claim 5 wherein said processor includes means for (a) determining for each position of the deflector where said spots will appear on the associated photosensitive medium; (b) selecting pixels from the image information store that correspond to these spots; and (c) in combination with said modulators modulates said light beams.

7. A printer system according to claim 5 wherein said means for reading includes means for (a) determining for each position of the deflector where said spots will appear on the associated photosensitive medium; and (b) selecting pixels from the store that correspond to these spots.

8. A printer system according to claim 5 wherein said means for controlling the intensity modulates said light beams and said modulators in combination modulate said light beams at three different data rates, said data rates being $$f_B = k_1 \times f_G;$$

and $$f_R = k_2 \times f_G,$$

where $f_B$, $f_G$ and $f_R$ are data input creates for blue, green and red wavelengths beams, $k_1$ and $k_2$ are constants chosen to compensate for spot separation during a line scan.

9. A printer system according to claim 5 further comprising beam-shaping optics (i) intercepting said single light beam and (ii) reshaping said single light beam by modifying a vergence of the single light beam, thus providing appropriate waist locations in line and page directions for said single light beam.

10. A printer system according to claim 5 further comprising a conjugating cylindrical mirror (a) having a concave radius in page direction; (b) being located between said f-θ lens and said associated photosensitive medium; and (c) receiving the deflected light beam from said f-θ lens, and (d) directing it onto the associated photosensitive medium.

11. A printer system according to claim 6 further comprising a conjugating cylindrical mirror (a) having a concave radius in page direction, b) being located between said f-θ lens and said associated photosensitive medium, (c) receiving the deflected light beam from said f-θ lens, and (d) directing it onto the associated photosensitive medium.

12. A printer system of claim 8, wherein said single light beam is a combination of (a) a first beam having a wavelength of about 532 nm, (b) a second beam having a wavelength of about 458 nm, and (c) a third beam having a wavelength of about 685 nm.

13. A printer system according to claim 5 wherein:
a) said beam combiner is a fiber optics multiplexor combining modulated light beams of different wavelength into a common beam having a common waist location for the three colors, said waist location being adjacent to the fiber optic multiplexor;
(b) said deflector is a movable reflective facet; and said printer system further including
an apochromatic focusing lens re-imaging the three waists having a common location to a second common location and magnifying the waist sizes by a common magnification factor; and
apochromatic beam-shaping optics following the apochromatic focusing lens, said beam-shaping optics producing a page direction waist in all three colors adjacent to the reflective facet and a line direction waist in all three colors at a distance approximately $$\frac{f}{3}$$

behind the first vertex of the f-θ lens.

* * * * *